US010585718B2

(12) United States Patent
Sardino et al.

(10) Patent No.: US 10,585,718 B2
(45) Date of Patent: *Mar. 10, 2020

(54) HYBRID ACCELERATION IN A PROCESSING ENVIRONMENT

(71) Applicant: International Business Machines Corporation, Armonk, NY (US)

(72) Inventors: Nicholas P. Sardino, Hyde Park, NY (US); Anthony T. Sofia, Hopewell-Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 99 days.

This patent is subject to a terminal disclaimer.

(21) Appl. No.: 15/801,500

(22) Filed: Nov. 2, 2017

(65) Prior Publication Data

US 2019/0065284 A1 Feb. 28, 2019

Related U.S. Application Data

(63) Continuation of application No. 15/685,653, filed on Aug. 24, 2017.

(51) Int. Cl.
*G06F 9/46* (2006.01)
*G06F 9/52* (2006.01)
(Continued)

(52) U.S. Cl.
CPC ......... *G06F 9/526* (2013.01); *G05B 23/0251* (2013.01); *G06F 3/0674* (2013.01); *H04L 1/22* (2013.01)

(58) Field of Classification Search
CPC .......... G06F 9/50; G06F 9/526; G06F 3/0674; G05B 23/0251
See application file for complete search history.

(56) References Cited

U.S. PATENT DOCUMENTS 8,274,518 B2  9/2012  Blythe
9,032,484 B2  5/2015  Chambliss et al.
(Continued)

FOREIGN PATENT DOCUMENTS

CN  105630882 A  6/2016

OTHER PUBLICATIONS

List of IBM Patents or Patent Applications Treated as Related; (Appendix P), filed Nov. 2, 2017, 2 pages.
(Continued)

*Primary Examiner* — James J Lee
(74) *Attorney, Agent, or Firm* — Cantor Colburn LLP; William Kinnaman (57) ABSTRACT

Embodiments of the invention include methods and systems for hybrid acceleration in a processing environment. Aspects of the invention include transmitting, by a first computing system to a second computing system, a request for access to an accelerator. The first computing system receives access information for a plurality of accelerators from the second computing system responsive to the request. The first computing system analyzes the access information for the plurality of accelerators to identify a first accelerator from the plurality of accelerators and offloads a first processing job to the first accelerator utilizing the access information.

9 Claims, 5 Drawing Sheets

(51) Int. Cl.
  *G05B 23/02*  (2006.01)
  *H04L 1/22*  (2006.01)
  *G06F 3/06*  (2006.01)

(56) References Cited

U.S. PATENT DOCUMENTS

2011/0161972 A1* 6/2011 Dillenberger ......... G06F 9/5044
                                                                  718/104
2016/0364271 A1* 12/2016 Burger .................. G06F 9/5027
2018/0173291 A1* 6/2018 Levit-Gurevich .... G06F 9/3867
2019/0065283 A1   2/2019 Sardino et al.

OTHER PUBLICATIONS

N. Sardino et al., "Hybrid Acceleration in a Processing Environment", U.S. Appl. No. 15/685,653, filed Aug. 24, 2017.
Anonymous, Auxiliary Cooling for High-Power and GPU Accelerator Adapters in a 4U Server, Jun. 7, 2016, 5 pages.
Anonymous, Efficient Accelerators for Matric Multiplication in Machine Learning, Oct. 9, 2015, 4 pages.
IBM, Method and Apparatus for Efficient Grouping in Map-Reduce Applications on GPU, Nov. 18, 2009, 7 pages.
John Canny, GPU Acceleration for Machine Learning, Google Research Computer Science Division, 2016, University of California, Berkeley.
List of IBM Patents or Patent Applications Treated as Related; (Appendix P), filed Jul. 2, 2019, 2 pages.

* cited by examiner

HYBRID ACCELERATION IN A PROCESSING ENVIRONMENT

DOMESTIC PRIORITY

The present application claims priority to U.S. Nonprovisional application Ser. No. 15/685,653 filed on Aug. 24, 2017, titled "HYBRID ACCELERATION IN A PROCESSING ENVIRONMENT", assigned to the assignee hereof and expressly incorporated by reference herein.

BACKGROUND

The present invention generally relates to machine learning, and more specifically, to hybrid acceleration in a processing environment.

In machine learning and deep learning environments, acceleration is utilized for building and training models quickly when dealing with large volumes of data. Machine learning is essentially pattern recognition and machine learning models or algorithms can learn from large amounts of training data to infer predictions on data. These models allow for results that are reliable and repeatable. Also, these models are sometimes utilized to discover hidden insights into data through learning from the historical relationship and/or trends in data. There is much focus on being able to develop machine learning models that are produced faster and, if necessary, re-trained faster for deployment in data analytics.

SUMMARY

Embodiments of the present invention are directed to a computer-implemented method for hybrid acceleration in a processing environment. A non-limiting example of the computer-implemented method includes transmitting, by a first computing system to a second computing system, a request for access to an accelerator. The first computing system receives access information for a plurality of accelerators from the second computing system responsive to the request. The first computing system analyzes the access information for the plurality of accelerators to identify a first accelerator from the plurality of accelerators and offloads a first processing job to the first accelerator utilizing the access information.

Embodiments of the present invention are directed to a system for hybrid acceleration in a processing environment. A non-limiting example of the system includes transmitting, by a first computing system to a second computing system, a request for access to an accelerator. The first computing system receives access information for a plurality of accelerators from the second computing system responsive to the request. The first computing system analyzes the access information for the plurality of accelerators to identify a first accelerator from the plurality of accelerators and offloads a first processing job to the first accelerator utilizing the access information.

Embodiments of the invention are directed to a computer program product for hybrid acceleration in a processing environment, the computer program product comprising a computer readable storage medium having program instructions embodied therewith. The program instructions are executable by a processor to cause the processor to perform a method. A non-limiting example of the method includes transmitting, by a first computing system to a second computing system, a request for access to an accelerator. The first computing system receives access information for a plurality of accelerators from the second computing system responsive to the request. The first computing system analyzes the access information for the plurality of accelerators to identify a first accelerator from the plurality of accelerators and offloads a first processing job to the first accelerator utilizing the access information.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
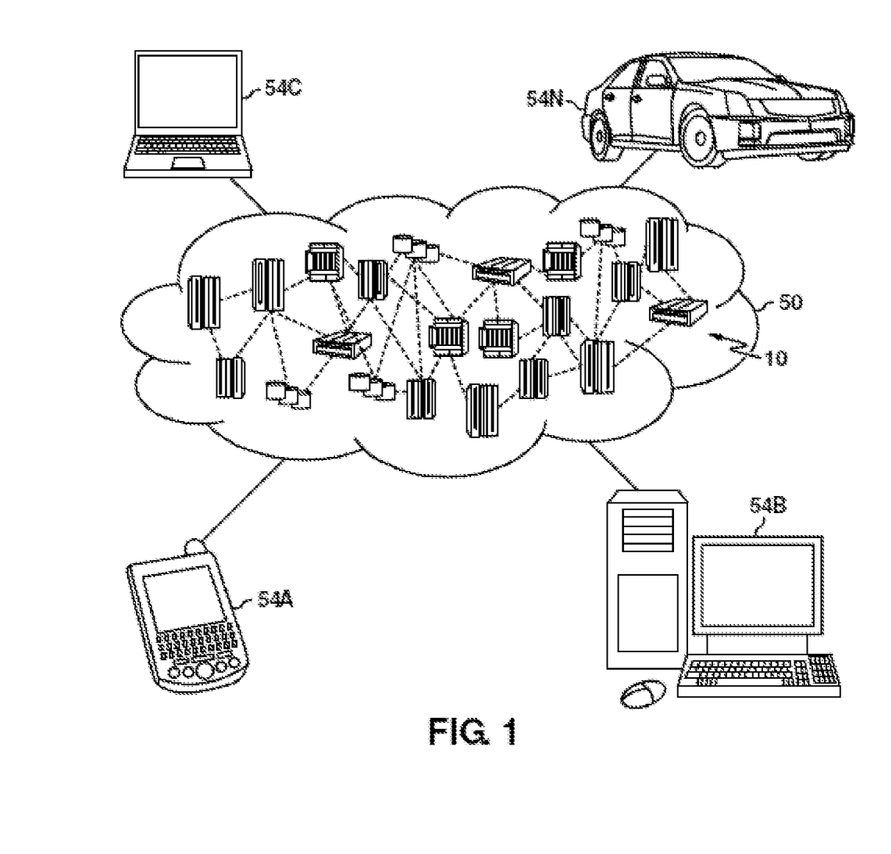
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
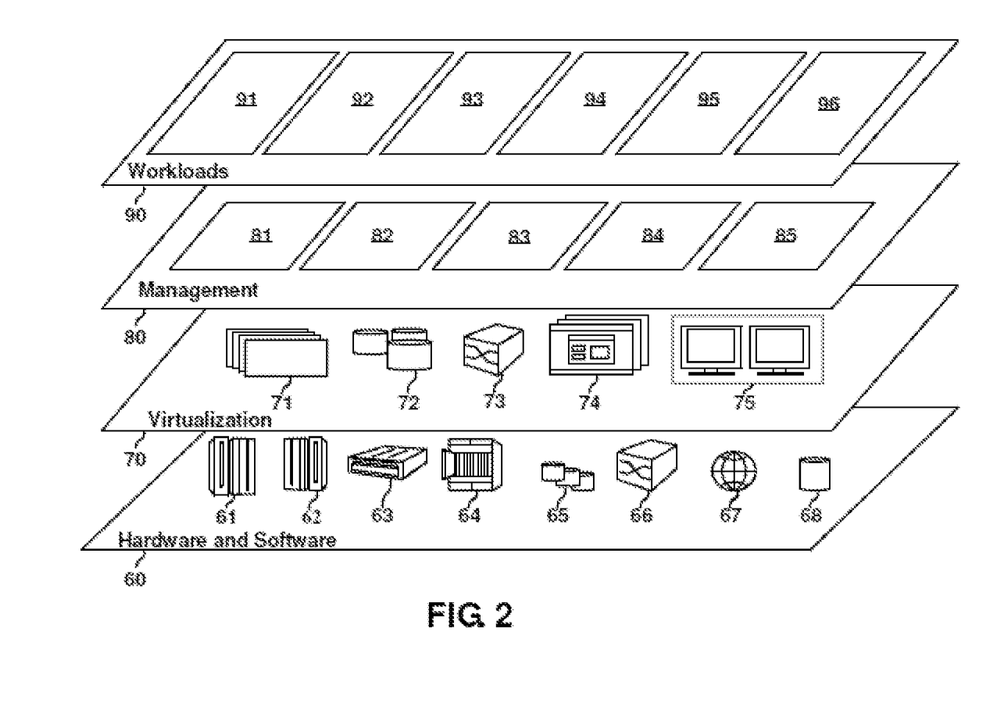
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hybrid acceleration 96.

Figure 3:
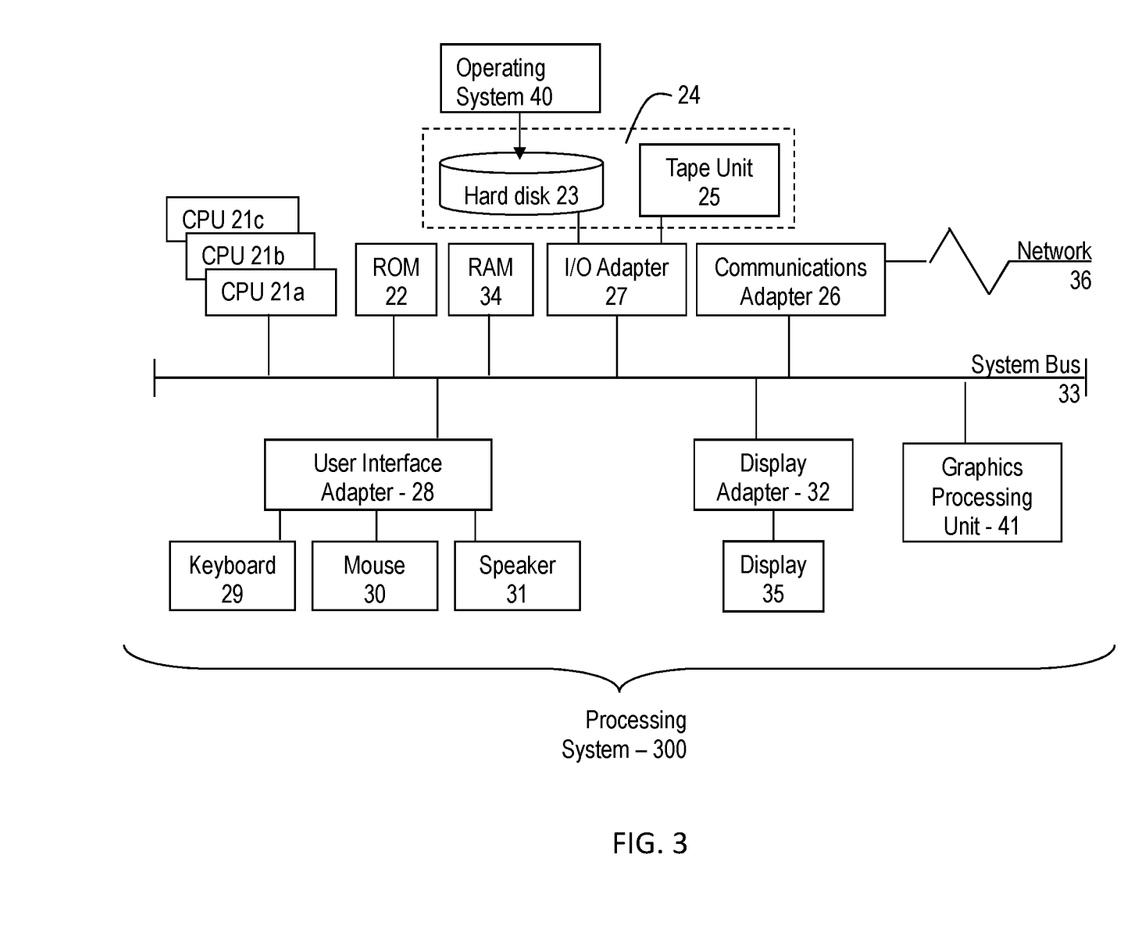
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, a hybrid acceleration methodology for machine learning models is provided. Machine learning is basically the extraction of features from data in order to solve a predictive problem. A machine learning (sometimes referred to as "deep learning") algorithm automatically learns to recognize complex patterns and make intelligent decisions based on insight generated from learning. Machine learning techniques include Random Forests, Decision Tree, Ada boost, SVM, k nearest neighbors, and Naïve Bayes. Some additional machine learning techniques include convolutional neural networks (CNNs) and recurrent neural networks (RNNs). A machine learning model may employ imputation techniques to improve a training dataset to achieve a higher confidence level. Imputation techniques (i.e. substitution of missing values) include k nearest neighbor imputation and random forest imputation. More exemplary machine learning techniques include converting multi-class classification into a combination of several binary classifications. An example of a binary classification that can be employed includes a one-against-all approach. Some machine learning techniques may employ a greedy-based sequential binary classification model to classify features. This model uses the one-against-all decomposition strategy for each binary classification and chooses the best split as the decomposition for that iteration. This is done iteratively until all the classes are classified.

Machine learning models are built using training data. Large blocks of training data are needed to train machine learning models. In the machine learning and deep learning space, it is becoming very typically for acceleration to be used in order to train systems quickly with large volumes of data. One acceleration method is to use Graphical Processing Units (GPUs); however, there are also many efforts that will utilize custom ASIC logic. The ability to quickly leverage advances in this space depends on several factors. However, from an application programmer perspective, an important usage requirement is for the acceleration to be dynamically discovered and have the appropriate work routed to it. For machine learning and deep learning, the separation comes between the training of models and the inference of new data points using those models.

A graphical processing unit (GPU) is a specialized electronic circuit designed to rapidly manipulate and alter memory to accelerate the creation of images in a frame buffer intended for output to a display device. GPUs are very efficient at manipulating computer graphics and image processing, and their highly parallel structure makes them more efficient than general-purpose CPUs for algorithms where the processing of large blocks of data is done in parallel. An application-specific integrated circuit (ASIC) is an integrated circuit customized for a particular use, rather than intended for general-purpose use.

In one or more embodiments of the present invention, a system of discovery for accelerators in a hybrid environment is provided. For the mainframe computing systems, the acceleration technology can be network attached servers that contain specialty processing, (e.g., GPUs) and a layer of support that can use the discovery service and route applicable work to the accelerator. The method described allows for acceleration technology available on a different computer platform to be connected and discovered without application awareness on the different computing platform. The reason for integrating the second computing platform could be that it provides unique acceleration that is not available on the primary platform, for example GPUs or custom ASICs, but the data is all stored and managed on the primary platform.

The application manages the deployment of jobs into the system. For machine learning and deep learning applications, the two tasks train a model and then perform inferences using that model.

In machine learning, there is typically a large amount of data that goes into model training. This model training drives a large amount of processing resources that can take a long elapsed time absent any acceleration technology. Acceleration technology (e.g., GPUs, ASICs, etc.) allows for faster model training and allows machine learning specialists to iterate faster during their work. This acceleration technology also allows for re-training of models more frequently which leads to better results from the model. Inference processing is when a model is deployed and used to score new data that is flowing into the system. This can include doing some in-transaction processing. The inference can be invoked through a programmable API once the model is available by existing programs.

Figure 4:
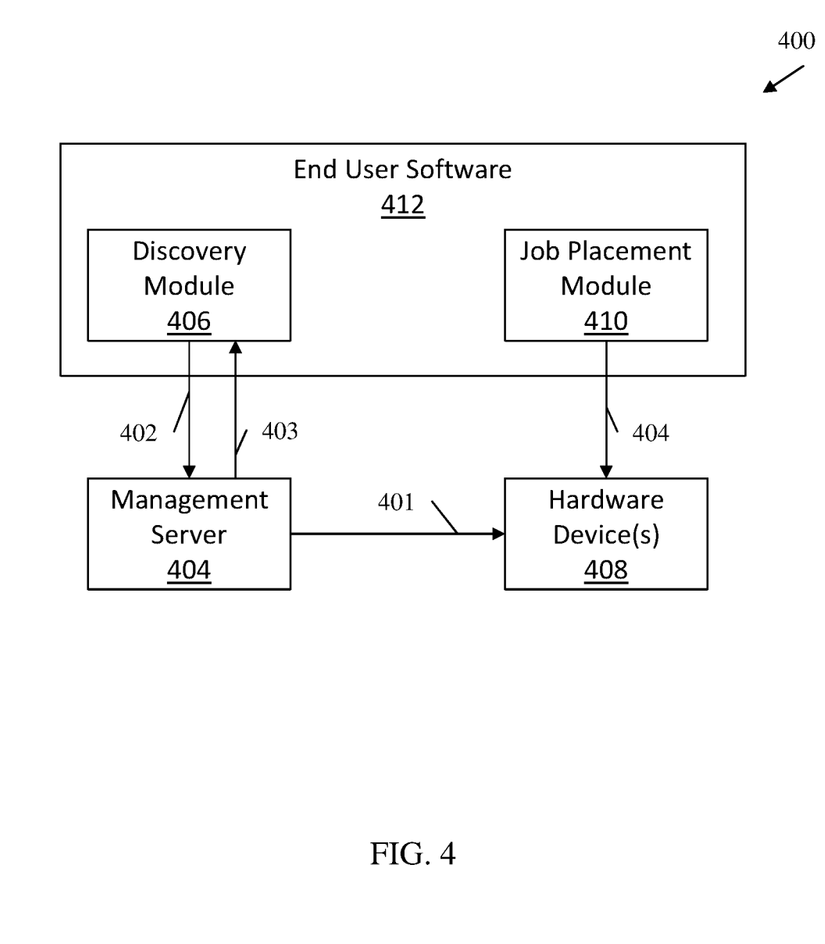
FIG. 4 depicts a block diagram of a system for hybrid acceleration in a processing environment according to one or more embodiments of the present invention.

FIG. 4 depicts a block diagram of a system for hybrid acceleration in a processing environment according to one or more embodiments of the present invention. The system 400 includes an end-user software 412 located on a computing system much like the computing system described in FIG. 3. The end-user software 412 includes a discovery module 406 and a job placement module 410. The system 400 also includes a management server 404 and one or more hardware device(s) 408.

In one or more embodiments of the invention, the End User Software 412 and the Management Server 404 can be implemented on the processing system 300 found in FIG. 3. Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

In one or more embodiments, the hardware device(s) 408 include hardware accelerators such as, for example, graphical processing units (GPUs), field programmable gate arrays (FPGAs), application-specific integrated circuits (ASICs), and the like. These hardware device(s) are connected to the management server 404 on devices such as, for example, network attached servers and the like. The hardware accelerators reside on these network attached servers that are in electronic communication with the management server 404. The management server 404 discovers and indexes the hardware device(s) 408. The index includes performance and connectivity information about each of the hardware device(s) 408 such as, for example, access information, hardware capabilities, buffer size, network connection speed, current processing loads, special permissions, and the like.

In one or more embodiments, the end user software 412 provides the primitives to perform machine learning model training as well as model deployment for inference processing. The end user software 412 can also perform steps involving data preparation for the model training that would make the data utilized in the model training be correctly formatted, reduced, and the like before model training can take place.

In one or more embodiments, a request for hybrid acceleration can occur in the following sequence of steps. The management server 404 discovers and indexes hardware device(s) 408 available for training or inference processing as shown at 401. As described above the hardware device(s) 408 are accelerators that can be utilized for machine learning and deep learning model training and inference processing. It is possible that the deployment for inference be based on additional factors, such as logical proximity to the transactions that will require the result of the inference operation. Upon indexing the hardware device(s) 408, the management server 404 has the address of each accelerator and can provide access information to any requesting software applications from any client devices. When the end user software 412 requires access to an accelerator for a specific operating, such as training, the discovery module 406 can make a discovery call to the management server 404 as shown at 402. The management server 404 communicates back to the discovery module 406 any available accelerators located on the hardware device(s) 408 as shown at 403. At 403, the communication to the discovery module 406 includes access information for hardware device(s) 408 available. The access information can be provided to the discovery module 406 through an API or other similar interface. The job placement module 410 analyzes the access information for the accelerators and based on the job type (e.g., model training, inference processing, etc.) can select an accelerator to offload the machine learning job or any other processing job as shown at 404.

In one or more embodiments, the job placement module 410 monitors the performance of the accelerator during processing to ensure that a performance level is maintained. The performance level can be measured against a performance threshold level for performance requirements such as processing speed, connection latency, buffering size, and the like. Should the performance level of the current accelerator fall below the threshold level for any of the performance requirements, the job placement module 410 can communicate with the end-user software 412 and/or the discovery module to identify additional accelerators available that meet the job requirements. The discovery module 406 can transmit a request to the management server 404 for another set of accelerators available to take over the model training or any other job. Job requirements for acceleration include but are not limited to training models for use in machine learning and inference processing.

The job placement module can use historic data about the performance of jobs to determine the correct threshold for sending a job to an accelerator. Since the data required for the job requires transfer to the accelerated server, the total elapsed time of the training job may be lower if the operating is performed without accelerator but closer to the data. This threshold can either be set statically by the job placement server or discovered over time based on parallel training.

In one or more embodiments, the management server 404 can transmit to the discovery module 406 a plurality of available of accelerators' access information. Included in this access information can be the index information for each of the accelerators. The job placement module 410 selects an accelerator based on the job requirements matched to the performance information of the accelerator. A machine learning job can be assigned to only one accelerator or can be distributed across multiple accelerators depending on the job type and performance requirements needed to carry out the job. Also, as accelerators come online, the discovery module 406 can continue to request available accelerators from the management server 404 and provide any new or recently available accelerators to the job placement module 410. The job placement module 410 continues to monitor the usage of the one or more accelerators and can switch all or part of a job to other accelerators as the performance requirements are needed and/or if performance levels fall below a threshold.

In one or more embodiments, the job placement module 410 continuously monitors the accelerators to check for latency and connection issues as well as performance levels. Should any performance or connection issues arise, a failure can occur and the job placement module 410 can route the job back to another accelerator or to a resource located on the computer system running the end-user software 412, if available.

In one or more embodiments, the computing system running the end user software 412 does not have access permissions to any of the hardware device(s) 408 until the access information is provided by the management server 404. In another embodiment, the computing system running the end-user software 412 does have access permission to the hardware device(s) 408 before the access information is provided by the management server 404. In one or more embodiments, the hardware device(s) 408 reside on the management server 404. In another embodiment, the hardware device(s) 408 do not reside on the management server 404.

Figure 5:
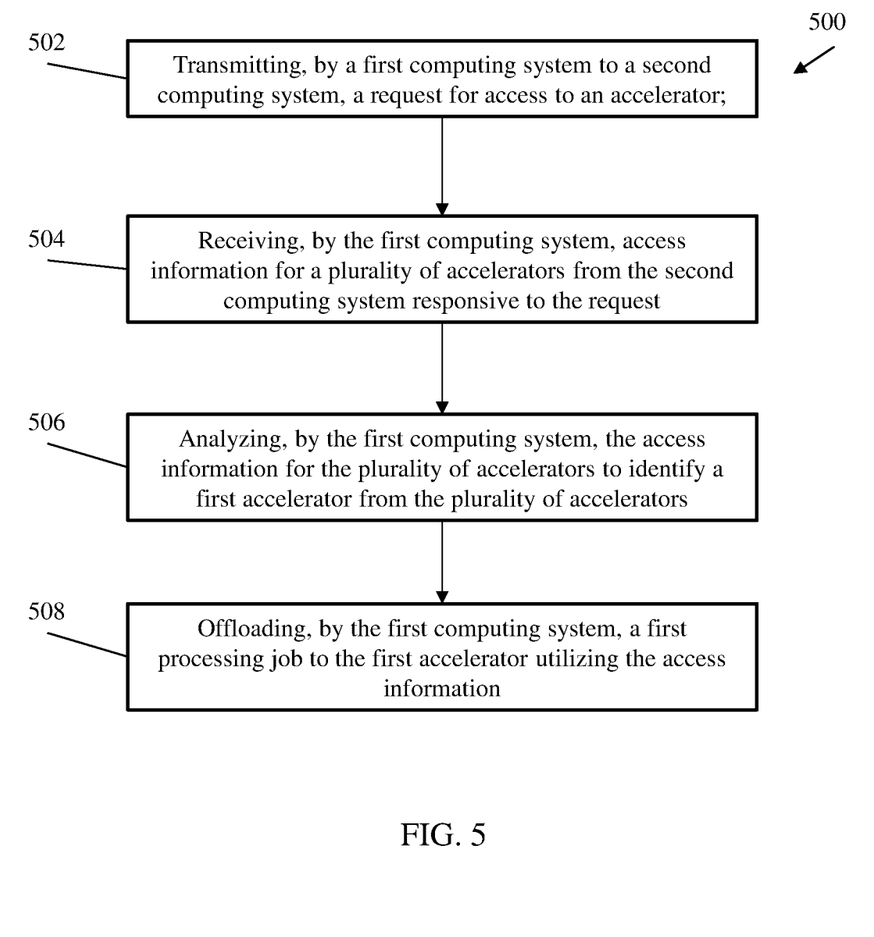
FIG. 5 depicts a flow diagram of a method for hybrid acceleration in a processing environment according to one or more embodiments of the invention.

FIG. 5 depicts a flow diagram of a method for hybrid acceleration in a processing environment according to one or more embodiments of the invention. The method 500 includes transmitting, by a first computing system to a second computing system, a request for access to an accelerator, as shown at block 502. At block 504, the method 500 includes receiving, by the first computing system, access information for a plurality of accelerators from the second computing system responsive to the request. The method 500, at block 506, includes analyzing, by the first computing system, the access information for the plurality of accelerators to identify a first accelerator from the plurality of accelerators. And at block 508, the method 500 includes offloading, by the first computing system, a first processing job to the first accelerator utilizing the access information.

Additional processes may also be included. It should be understood that the processes depicted in FIG. 5 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for hybrid acceleration, the method comprising:

transmitting, by a first computing system to a second computing system, a request for access to an accelerator, wherein the request for access comprises job requirements for a first processing job;

receiving, by the first computing system, access information for a plurality of accelerators from the second computing system responsive to the request, wherein the access information comprises historic job performance data for each accelerator of the plurality of accelerators and a transfer time for the first processing job to be transferred from the first computing system to the second computing system;

analyzing, by the first computing system, the access information for the plurality of accelerators to determine a first accelerator from the plurality of accelerators that meets the job requirements for the first processing job, wherein determining the first accelerator comprises:

analyzing the historical job performance data associated with the first accelerator and the transfer time to determine a total processing time for the first processing job; and comparing the total processing time to the job requirements; and offloading, by the first computing system, the first processing job to the first accelerator utilizing the access information.

2. The computer-implemented method of claim 1 further comprising:

analyzing, by the first computing system, the access information for the plurality of accelerators to identify a second accelerator from the plurality of accelerators; and offloading a second processing job to the second accelerator utilizing the access information.

3. The computer-implemented method of claim 1 further comprising:
   monitoring, by the first computing system, a performance level of the first accelerator.

4. The computer-implemented method of claim 3 further comprising:
   based at least in part on a determination that the performance level of the first accelerator is below a threshold performance level, analyzing the access information for the plurality of accelerators to identify a third accelerator from the plurality of accelerators; and
   offloading the first processing job to the third accelerator utilizing the access information.

5. The computer-implemented method of claim, 1 wherein the second computing system provides the plurality of accelerators based at least in part on the one or more job requirements.

6. The computer-implemented method of claim 1, wherein the first computing system is not authorized to access the first accelerator prior to receiving the access information.

7. The computer-implemented method of claim 1, wherein the first computing system is authorized to access the first accelerator prior to receiving the access information.

8. The computer-implemented method of claim 1, wherein the first accelerator is located on a separate computing system.

9. The computer-implemented method of claim 1, wherein the first accelerator is a graphical processing unit.

* * * * *